United States Patent [19]
Mao et al.

[11] 4,086,392
[45] Apr. 25, 1978

[54] METHOD FOR REDUCING THE FLOAT CURRENT OF MAINTENANCE-FREE BATTERY

[75] Inventors: George W. Mao, St. Paul; Purushothama Rao, Burnsville, both of Minn.

[73] Assignee: Gould Inc., Rolling Meadows, Ill.

[21] Appl. No.: 762,568

[22] Filed: Jan. 26, 1977

[51] Int. Cl.² ........................................... H01M 10/44
[52] U.S. Cl. ..................................... 429/50; 429/82; 429/225
[58] Field of Search ............... 429/205, 204, 225–228, 429/50, 82

[56] References Cited
U.S. PATENT DOCUMENTS

| | | | |
|---|---|---|---|
| 1,533,569 | 4/1925 | Pouchain | 429/205 X |
| 1,632,307 | 6/1927 | Miolati | 429/205 |
| 1,900,616 | 3/1933 | Pouchain | 429/205 |
| 2,170,650 | 8/1939 | Bouton et al. | 429/226 |
| 2,649,766 | 8/1953 | Johnson | 429/205 X |
| 2,650,257 | 8/1953 | Jolley | 429/205 |
| 2,820,079 | 1/1958 | Zahn | 429/245 |
| 3,607,408 | 9/1971 | Duddy | 429/227 X |
| 3,948,680 | 4/1976 | Mao et al. | 429/205 X |

*Primary Examiner*—Charles F. LeFevour
*Attorney, Agent, or Firm*—Leydig, Voit, Osann, Mayer & Holt, Ltd.

[57] ABSTRACT

A maintenance-free battery having improved float current (i.e.-current draw) characteristics is provided by adding elemental zinc, or a zinc affording compound such as zinc sulfate to the battery in amounts sufficient to decrease the float current that would otherwise occur during voltage regulated overcharge. Rather than utilizing zinc alone, a mixture of zinc and cadmium may likewise be employed.

15 Claims, No Drawings

METHOD FOR REDUCING THE FLOAT CURRENT OF MAINTENANCE-FREE BATTERY

RELATED APPLICATIONS

Mao, Ser. No. 640,192, filed Dec. 12, 1975, for: "Maintenance-Free Battery now U.S. Pat. No. 4,006,035 and Method for Reducing the Current Draw of Such Batteries"; a continuation-in-part of Ser. No. 514,023, filed Oct. 11, 1974.

Miller, Ser. No. 222,611, filed Feb. 1, 1972, for: "Cover Design for Maintenance-Free Battery", now U.S. Pat. No. 3,802,597.

Mao and Rao, Ser. No. 759,577 filed Jan. 14, 1977, for: "Lead Base Calcium-Tin Alloy and Use Thereof for Lead-Acid Battery Grid Fabrication"; a continuation of Ser. No. 577,463 filed May 14, 1975 which is a continuation of Ser. No. 403,179, filed Oct. 3, 1973, both now abandoned.

Rao and Mao, Ser. No. 580,194, filed May 23, 1975, for: "Lead Base Cadmium Tin Alloy Useful for Forming Battery Components" now U.S. Pat. No. 4,007,056; a continuation of Ser. No. 403,178, filed Oct. 3, 1973, now abandoned.

Mao and Lannoye, Ser. No. 724,855, filed Sept. 20, 1976, for: "Cadmium-Antimony-Lead-Alloy for Maintenance Free Lead-Acid Battery" now pending; a continuation of Ser. No. 536,441 filed Dec. 26, 1974, which is a continuation-in-part of Ser. No. 421,867, filed Dec. 5, 1973, both now abandoned.

Mao, Rao, and Trenter, Ser. No. 742,611, filed Nov. 17, 1976, for: "Maintenance-Free Battery", a continuation of Ser. No. 514,019, filed Oct. 11, 1974, now abandoned.

This invention relates to lead-acid storage batteries and, more particularly, to maintenance-free batteries having improved float current characteristics at normal operating float voltages.

Lead base alloys have been used for storage battery plate grids for many years. The electrochemical characteristics of lead as well as its low cost make it suitable as a primary material, but alloying ingredients must be included because of the inherent physical weakness of the lead. A large number of different alloying materials in various percentages and combinations have been considered. Antimony-lead alloys containing anywhere from about 4.5 to 12% by weight antimony have been used for the preparation of the grids for lead-acid batteries. The principal function of the antimony constituent is to impart adequate grid strength as well as permitting easy casting of the grid. Lithium and combinations of lithium and tin have likewise been employed as shown in U.S. Pat. No. 3,647,545. Still further, Canadian Pat. No. 920,393 describes a lead base alloy containing cadmium and antimony for use in forming battery grids. As shown in that patent, alloying about 2.5 to 3% cadmium with 2.5% antimony in a lead alloy imparts a tensile strength considerably above that which would ordinarily be expected.

Recently, much interest has been placed upon providing automotive type, wet cell, lead-acid storage batteries in configurations which can be readily installed and which require, once in service, no further maintenance throughout the expected life of the battery. One aspect of this effort to provide such maintenance-free batteries is to utilize internal components that make it unnecessary to inspect and maintain desired electrolyte levels in the cells over the normal battery life.

to achieve this maintenance-free objective, substantial reduction in the rate of water losses must be achieved. This requires that the electrode plates employed in the maintenance-free battery accept only a small current during constant voltage overcharge so that only minimum gas generation occurs with the accompanying water loss concomitantly minimized. With conventional automotive batteries using antimony-lead grids typically containing about 4.5% by weight antimony, the float current at the completion of charging is unacceptably high for maintenance-free battery applications. In addition, it is known that self-discharge of a wet, lead-acid battery employing an antimony alloy is increased by the dissolution of antimony from the grids and its subsequent deposition on the negative plates, where it causes electrochemical reactions that discharge the lead to lead sulfate. For these reasons, the development of suitable materials for grids in maintenance-free batteries has primarily emphasized the use of lead base alloys not containing antimony.

The copending Mao and Rao application, identified herein, presents one type of alloy suitable for forming the grids of maintenance-free batteries. Thus, a lead base alloy containing, by weight, 0.06 to 0.10% calcium and 0.10 to 0.40% tin is disclosed. A further approach is described in the previously identified Rao and Mao application. This discloses a cadmium-tin-lead alloy which is useful in forming components of the battery elements, including the battery grids in a maintenance-free battery.

A still further approach is described in the herein identified Mao and Lannoye applications in which a lead alloy containing, typically, from about 1.0 to 2.0% antimony and from about 1.2 to about 2.2% cadmium is disclosed. Lead-acid battery grids can be easily cast from such an alloy, and the grids may be advantageously employed in the preparation of maintenance-free batteries to provide superior characteristics.

While such alloys do provide suitable materials for forming battery grids for use in maintenance-free battery applications, it would be highly desirable to be able to provide maintenance-free batteries in which the magnitude of the float current during overcharge of the plates may be further decreased.

It is accordingly an object of the present invention to provide a maintenance-free battery having exceptionally low float current characteristics.

Another object provides a method for decreasing the float current required at a given float voltage of the alloys used in such applications.

A still further and more specific object of this invention lies in the provision of a maintenance-free battery which possesses improved float current characteristics, but which can utilize a wide range of alloy compositions for forming the grids.

Yet another object is to provide a method of lessening the criticality of the impurities typically observed for the alloys used to form the battery grids in maintenance-free battery applications.

Other objects and advantages of the present invention will be apparent as the following description proceeds.

While the invention is susceptible of various modifications and alternative forms, specific embodiments thereof will hereinafter be described in detail. It should be understood, however, that it is not intended to limit the invention to the particular forms disclosed, but, on the contrary, the intention is to cover all modifications, equivalents and alternatives falling within the spirit and scope of the invention as expressed in the appending claims.

In general, the present invention is predicated on the discovery that the addition of elemental zinc (e.g. — as a fine powder) or a zinc compound to the battery in certain levels in a maintenance-free battery application significantly diminishes the required float current, and thus the water consumption in voltage regulated charging modes so as to improve the performance of the battery.

The zinc compound which is utilized in accordance with this invention may comprise zinc sulfate or any other zinc compound which is: (1) sufficiently soluble in the aqueous sulfuric acid solutions used as the electrolyte to provide the requisite amount of the zinc (a less important factor when the zinc is added directly to the negative electrode paste as will be discussed hereinafter), (2) not substantially harmful to either the battery components or to the performance of the battery in use and (3) not susceptible to producing a lead salt that would likely precipitate in sufficient amounts which would significantly reduce the porosity of the battery plates. For example, zinc hydroxide could suitably be used.

The amount of the zinc compound which is used should be sufficient to decrease the float current during constant voltage overcharge. Typically, the battery at this stage will be in a fully charged condition. While the amount can vary so long as the amount of zinc provided is sufficient to decrease the float current to the extent required, it has been found suitable to utilize amounts in the range of from about 0.01% (or somewhat less) to about 0.3%, based upon the total weight of the electrolyte, when the zinc compound employed is zinc sulfate (viz.-$Zn-SO_4.7H_2O$). The amount required may vary somewhat depending upon the manner in which it is added to the battery, as will be discussed later. When compounds other than zinc sulfate are employed, the amount can desirably, of course, be varied to provide the same amount of zinc that would be provided by the amount of zinc in the zinc sulfate in the range set forth herein.

The zinc or zinc compound may be added to the battery in any manner desired so long as the requisite amount of zinc provided in fact functions to decrease the float current to the extent required. It is thus certainly expeditious to add the zinc affording compound directly to the electrolyte. Also, the zinc or zinc affording compound may be added to the paste used for the electrodes. Still further, the zinc or zinc affording compound could be added to other internal components of the battery such as, for example, the separators used.

While the manner in which the present invention serves to improve the float current characteristics of the resulting battery is not fully understood, it is believed that the benefits are achieved due to zinc depositing, or plating out, on the negative electrodes during voltage regulated overcharge. The electrolyte may thus be viewed as, in effect, a transport medium for the zinc. For this reason, when the zinc or zinc affording compound is added to the active material paste of the negative electrodes, the minimum amount required may be somewhat less, i.e.—an amount of 0.005%, based upon the total weight of the active paste material, may be useful.

In any event, regardless of the method of addition of the zinc or zinc affording compound, a certain amount of zinc will, directly or indirectly, be present in the electrolyte. Accordingly, for the sake of simplicity, as used herein, the terminology "adding to the electrolyte" or "electrolyte contains an additive" shall mean adding the zinc or zinc affording compound to the battery in any fashion that results in the battery having improved float current characteristics.

As is disclosed in the previously identified Mao application, the addition of cadmium or a compond affording cadmium likewise serves to decrease the current draw (i.e.—the float current) that would otherwise occur during overcharge. It is accordingly within the scope of the present invention to add to the electrolyte a mixture of zinc and cadmium in an amount which is effective to decrease the required float current. The relative amounts can be varied as desired so long as the total provides the requisite amount of decrease in the float current.

With respect to the materials used to form the electrodes or battery grids, any material can be used so long as the material does not contain any impurities in an amount that would adversely affect in a significant fashion the functioning of the zinc or, when mixtures are used, the zinc and cadmium. For example, if an alloy containing antimony is used, the amount of antimony present should be sufficiently low so as not to completely eliminate the benefits achieved by the addition of the zinc or zinc and cadmium. Thus, it is preferred to utilize an alloy for the negative electrodes which is essentially free of antimony. More particularly, for the negative electrode, the alloy employed should not only be essentially free of antimony but should be capable of allowing the zinc or zinc and cadmium added to the electrolyte to deposit on the negative electrode during charging. Typically, it is believed suitable to use an alloy for the positive electrodes where the antimony content is no more than about 2 to 3% by weight. It is preferred to utilize calcium-lead alloys for the negative grids typically containing calcium in an amount from about 0.01 to about 0.15% by weight of the alloy and preferably about 0.06 to 0.10%. The calcium-lead alloy may, if desired, include other alloying ingredients so long as the float current characteristics are not significantly adversely affected. It is particularly preferred to employ a lead base alloy containing about 0.06% to about 0.10% calcium, preferably 0.07%—0.09%, and a tin content of about 0.1% to about 0.4%, preferably 0.20%—0.30%. Alloys of this latter type have a remarkably improved resistance to drossing, thus permitting rapid casting and accurate calcium content control.

It should be appreciated that the alloys employed can contain negligible amount of impurities such as are typically in commercially available battery grade lead. While impurities may be contained in the calcium and tin components, or other alloying ingredients used, the relatively small amounts of these components make the typical impurities unimportant. Thus, as has been set forth herein, it should be appreciated that the alloys used can include other ingredients so long as they do not adversely affect the desirable features attributable to the present invention. For example, while it is preferred to utilize an alloy for the negative electrode which contains no antimony whatever, it is suitable to use an alloy which is only essentially free of antimony, i.e. — the antimony present is in such a minor amount that the zinc or zinc and cadmium added to the electrolyte is allowed to preferentially migrate to the negative electrode and deposit thereon during charging in amounts sufficient to decrease the float current during constant voltage overcharge of the maintenance-free battery.

While the present invention is advantageously utilized with batteries having grids formed from alloys already possessing improved float current characteristics such as, for example calcium-lead or calcium-tin-lead compositions, the most advantageous application may well lie with use with alloys that impart less than optimum float current characteristics to batteries having grids formed from such alloys. Thus, as an illustrative example, using the cadmium-antimony-lead alloys described in the prior Mao and Lannoye applications to form battery grids provide substantial advantages and imparts to the resulting batteries unexpectedly good float current characteristics. Still, the float current characteristics of such batteries are inferior to those achieved when calcium-lead binary or ternary alloys are employed. However, the use of the present invention will allow, it is believed, sufficient improvement in the float current characteristics with grids formed from such alloys that the need to employ calcium-lead alloys may well be obviated. This allows the benefits of the particular alloys to be enjoyed without any significant reduction in the float current characteristics and related water loss rates.

The particular configuration for the battery can very within wide limits, and the specific construction is not critical insofar as this invention is concerned. Suitable embodiments are shown in the copending Miller patent and the Mao and Lannoye applications identified herein.

Similarly, suitable sulfuric acid electrolytes used in lead-acid batteries are well known, typically used electrolytes having a full charge specific gravity of about 1.265.

EXAMPLES 1-3

Three maintenance-free batteries having grids formed from different alloy compositions were tested to show the effects of the inclusion of a zinc compound in accordance with the present invention on the float current characteristics of the batteries.

The alloys compositions employed are set forth in Table I:

Table I

| Example No. | Positive Grid Alloy* | Negative Grid Alloy* |
|---|---|---|
| 1 | Calcium - 0.09<br>Tin - 0.37<br>Lead - remainder | Calcium - 0.12<br>Tin - 0.40<br>Lead - remainder |
| 2 | Cadmium - 1.41<br>Antimony - 1.27<br>Lead - remainder | Cadmium - 1.41<br>Animony - 1.27<br>Lead - remainder |
| 3 | Cadmium - 1.41<br>Antimony - 1.27<br>Lead - remainder | Calcium - 0.125<br>Tin - 0.365<br>Lead - remainder |

*Amounts set forth are in percentage by weight of the alloy.

The batteries were tested while being maintained in a water bath at 125° F. Each battery was brought to a full state-of charge condition with no additive present (determined when the voltage reached an equilibrium value) and then discharged for 1 ampere hour at a 25 amp. discharge rate, simulating the current drain of a battery in one hard start in an automobile. While still being maintained in the water bath, each battery was then subjected to a constant potential charge at 14.1 volts for 60 minutes. Three of the six cells in each battery were selected at random during the preceding constant potential charge test phase, and the total volume of gases generated from each cell as a function of time was determined. One of these cells, free of any gas leaks, was then used to monitor the total gases generated as a function of time, during this 60 minutes of constant potential charging following the 1 amphr discharge. The total water loss that would be incurred for all six cells combined of each battery was calculated from the volume of total gases generated in the single monitored cell. The gassing current after 60 minutes of constant potential charging of the battery was also determined.

To compare the performance of these batteries after addition of a zinc additive, the free electrolyte from each battery was removed by inverting and draining. To each of the drained electrolytes, a measured amount of $ZnSO_4 \cdot 7H_2O$ was then added to the electrolyte and the batteries were refilled with the modified electrolyte to the same level and charged to insure thorough electrolyte mixing. The test procedure set forth above was then repeated. In Example 1, after repeating the gassing test with the electrolyte with additive, the battery was again drained of free electrolyte and further $ZnSO_4 \cdot 7H_2O$ added to show the effect of an increased amount of additive, with the gassing test procedure being again repeated.

The comparative results are set forth in Table II:

Table II

| Example No. | Battery Type* | Additive Amount gms/battery | Total Gas Generated, c.c. 30 min. | Total Gas Generated, c.c. 60 min. | Equivalent Water Loss (in grams) 30 min. | Equivalent Water Loss (in grams) 60 min. | Gassing Current-in mA at 60 mins. into charging |
|---|---|---|---|---|---|---|---|
| 1 | Group 27-93 Ampere Hour Capacity | 0 | 90 | 147 | 0.0484 | 0.0791 | 200 |
|  |  | 6 | 64 | 104 | 0.0344 | 0.0560 | 150 |
|  |  | 10 | 45 | 72 | 0.0242 | 0.0387 | 108 |
| 2 | Group 24-70 Ampere Hour Capacity | 0 | 131 | 222 | 0.0705 | 0.1195 | 315 |
|  |  | 5 | 104 | 177 | 0.0560 | 0.0953 | 250 |
| 3 | Group 24-70 Ampere Hour Capacity | 0 | 82 | 142 | 0.0441 | 0.0764 | 208 |
|  |  | 5 | 64 | 102 | 0.0344 | 0.0549 | 129 |

*All were of the 12 Volt type 6 cells each.

The test procedure used here simulates a relatively heavy current drain from the battery corresponding to a difficult start of an automobile, followed by charging under driving conditions for up to 60 minutes. The results demonstrate that use of the present invention, under these conditions, significantly reduced water loss in every instance.

EXAMPLES 4–6

To further illustrate the present invention, three cells were constructed, each having six positive and seven negative electrodes. The plates were hand pasted and formed in accordance with specifications for a 70 Ampere Hour Battery.

Example 4 was built from grids of a conventional antimony-lead alloy, the weight per cent antimony being about 4.5. Examples 5 and 6 were built with grids of a calcium-tin-lead alloy. The positive grid alloy contained 0.1 per cent calcium and 0.35 per cent tin; and the negative grid alloy contained 0.12 per cent calcium and 0.4 per cent tin. All percentages were based upon the weight of the alloy and are nominal percentages. Example 6 included about 340 p.p.m. zinc in the paste used for both the positive and negative grids. Gassing current was measured while floating each cell at 2.35 volts and at 125° F.

At the end of the formation, each cell was placed in a water bath maintained at 125° F. and tested to determine the gassing characteristics, EMF, and negative electrode potential (with reference to cadmium). After undergoing a 25 amp. discharge to a cut-off voltage of 1.75 volts per cell and then being fully charged back, the gassing current (Gassing II) was again determined. A further gassing current (Gassing III) was determined after further sequences of a 25 amp. discharge followed by fully charging back, which were undertaken to insure that the 0° F. cold performance and reserve capacity were satisfactory. After about one day, the gassing current (Gassing IV) was again determined. The results are set forth in Table III:

Table III

| Example No. | Cell EMF-volts | Neg. Electrode, volts (reference: Cadmium) | Gassing I* | Gassing II* | Gassing III* | Gassing IV* |
| --- | --- | --- | --- | --- | --- | --- |
| 4 | 2.46 | −0.118 | 1622 | 2700 | 3500 | — |
| 5 | 2.69 | −0.351 | 123 | 93 | 125 | 99 |
| 6 | 2.76 | −0.446 | 133 | 77 | 102 | 68 |

*All gassing current values are reported in milliamps.

As is seen, after the initial gassing determination, the inclusion of the zinc additive in accordance with the present invention (Example 6) provides further reduction in the gassing current developed, even in relation to Example 5 which itself has superior gassing characteristics.

Thus, as has been seen, the present invention provides a maintenance-free battery which is characterized by improved float current characteristics. As is also illustrated in the Examples, the inclusion of suitable amounts of the zinc additive in accordance with the present invention results in significantly lower float currents, i.e. the gassing currents, thus resulting in lower water losses. The implications of the benefits provided by this invention are substantial. The present invention thus allows usage of a wider range and type of alloy compositions for making the grids while still achieving the performance characteristics required of a battery needing no maintenance during its useful life.

We claim:

1. A method of reducing the gassing current during constant voltage overcharge in a maintenance-free battery comprising a sealed battery container except for venting means having a plurality of cells each including a plurality of positive and negative electrodes disposed therein comprising a grid structure having a layer of active material attached thereto and an electrolyte contained in the cells which comprises adding an additive consisting of zinc or a zinc compound to said electrolyte in an amount sufficient to decrease the gassing current during constant voltage overcharge, the amount of zinc corresponding to that provided by from about 0.1 to about 0.3% zinc sulfate, based upon the weight of the electrolyte, and at least the grid structure for the negative electrode consists of a lead alloy.

2. A method of reducing the gassing current during constant voltage overcharge in a maintenance-free, lead-acid battery comprising a battery container having a plurality of cells, said container being sealed except for venting means providing passages for the escape of evolved gas and an electrolyte contained in the cells, each cell including a plurality of positive and negative electrodes disposed therein comprising a grid structure having a layer of active material attached thereto, which comprises adding an additive consisting of zinc or a zinc compound in an amount sufficient to decrease the gassing current during constant voltage overcharge of said maintenance-free battery and at least the grid structures for the negative electrodes consist of a lead alloy.

3. The method of claim 2 wherein said zinc is provided by the addition of zinc sulfate.

4. The method of claim 3 wherein at least the grid structure of the negative electrodes consists essentially of a lead base alloy constaining calcium in an amount of from about 0.01 to about 0.15%, based upon the weight of the alloy.

5. The method of claim 3 wherein at least the grid structure of the negative electrodes consists essentially of a lead base alloy containing calcium in an amount of from about 0.01 to about 0.15% and tin in an amount of from about 0.10 to about 0.40%, based on the weight of the alloy.

6. The method of claim 5 wherein said lead base alloy contains calcium in an amount of 0.07 to 0.09% and tin in an amount of 0.20 to 0.30%.

7. The method of claim 2 wherein the amount of zinc added corresponds to that provided by from about 0.005 to about 0.3% zinc sulfate, based upon the weight of the electrolyte.

8. The method of claim 2 wherein the amount of zinc corresponds to that provided by from about 0.01 to about 0.3% zinc sulfate, based upon the weight of the electrolyte.

9. The method of claim 2 wherein the zinc is provided by addition to the active material of at least some of the electrodes.

10. The method of claim 2 wherein the zinc is provided by addition to the active material of at least some of the negative electrodes.

11. The method of claim 2 wherein the amount of zinc added corresponds to that provided by from about 0.005 to about 0.3% zinc sulfate, based upon the weight of the active material.

12. The method of claim 2 wherein the grid structure consists essentially of a lead base alloy containing from about 1.2 to about 2.0% cadmium and from about 1.0 to about 1.9% antimony, based upon the weight of the alloy.

13. The method of claim 2 wherein the grid structure of the positive electrodes consists essentially of a lead base alloy containing from about 1.2 to about 2.0% cadmium and from about 1.0 to about 1.9% antimony, based upon the weight of the alloy, and the grid structure of negative electrodes consists essentially of a lead-calcium alloy.

14. The method of claim 13 wherein the lead-calcium alloy contains from about 0.01 to about 0.15% calcium and from about 0.1 to about 0.4% tin, the percentages, being based upon the weight of the alloy.

15. A method of reducing the gassing current during constant voltage overcharge in a maintenance-free, lead-acid battery comprising a battery container having a plurality of cells, said container being sealed except for venting means providing passages for the escape of evolved gas and electrolyte contained in the cells, each cell including a plurality of positive and negative electrodes disposed therein comprising a grid structure having a layer of active material attached thereto, which comprises adding an additive mixture of cadmium and zinc or compounds thereof in an amount sufficient to decrease the gassing current during constant voltage overcharge of said maintenance-free battery, the grid structure for the negative electrodes consisting of a lead alloy which allows the zinc and cadmium mixture to decrease the gassing current during constant voltage overcharge of the maintenance-free battery.

* * * * *